(No Model.)  2 Sheets—Sheet 1.

F. W. A. FRERICHS.
PROCESS OF MANUFACTURING ACETANILID.

No. 586,551. Patented July 20, 1897.

Witnesses
W. C. Alexander.
E. E. Vernell.

Inventor
F. W. A. Frerichs
By Attorneys
Fowler & Fowler (No Model.) 2 Sheets—Sheet 2.

F. W. A. FRERICHS.
PROCESS OF MANUFACTURING ACETANILID.

No. 586,551. Patented July 20, 1897.

Witnesses
W. G. Alexander
E. E. Vernell

Inventor
F. W. A. Frerichs
By Attorneys
Fowler & Fowler

UNITED STATES PATENT OFFICE.

FREDERICK W. A. FRERICHS, OF ST. LOUIS, MISSOURI.

PROCESS OF MANUFACTURING ACETANILID.

SPECIFICATION forming part of Letters Patent No. 586,551, dated July 20, 1897.

Application filed May 16, 1896. Serial No. 591,763. (No specimens.)

*To all whom it may concern:*

Be it known that I, FREDERICK W. A. FRERICHS, a citizen of the United States, residing at the city of St. Louis, in the State of Missouri, have invented a certain new and useful Process for Manufacturing Acetanilid, of which the following is such a full, clear, and exact description as will enable any one skilled in the art to which it appertains to make and use the same, reference being had to the accompanying drawings, forming part of this specification.

My invention relates to a new and useful process of manufacturing acetanilid, and more particularly for manufacturing acetanilid from the ordinary commercial acetic acid—that is, from acetic acid of less strength than glacial acetic acid.

Heretofore acetanilid has always been manufactured by first boiling glacial acetic acid—that is, acid containing, approximately, one hundred per cent. of absolute acetic acid and anilin oil—and then separating the resulting acetanilid from the undecomposed anilin-oil and acetic acid by distillation. The cost of commercial acetic acid is very small compared with that of the glacial acetic acid, but all attempts to manufacture acetanilid from it by the ordinary method have resulted in the production of but minute quantities of acetanilid, the larger part of the anilin and acetic acid distilling over uncombined. I have also found that the separation of anilin-oil from acetanilid, as heretofore done, is accompanied by considerable loss of acetanilid by decomposition owing to the high boiling-point of anilin-oil.

The objects of my invention are the manufacture of acetanilid from this commercial or weak acetic acid, thus greatly reducing the cost of manufacture and the separation of the anilin-oil without decomposing the acetanilid.

My invention consists in distilling acetic acid and anilin-oil while agitated and in separating anilin-oil from acetanilid by distillation in a vacuum while subjected to the action of live steam.

Figure 1:
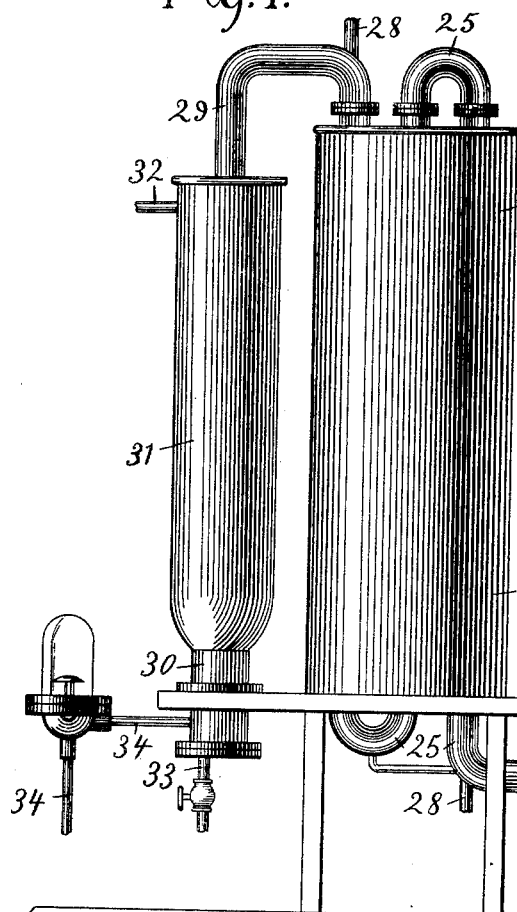
Figure 2:
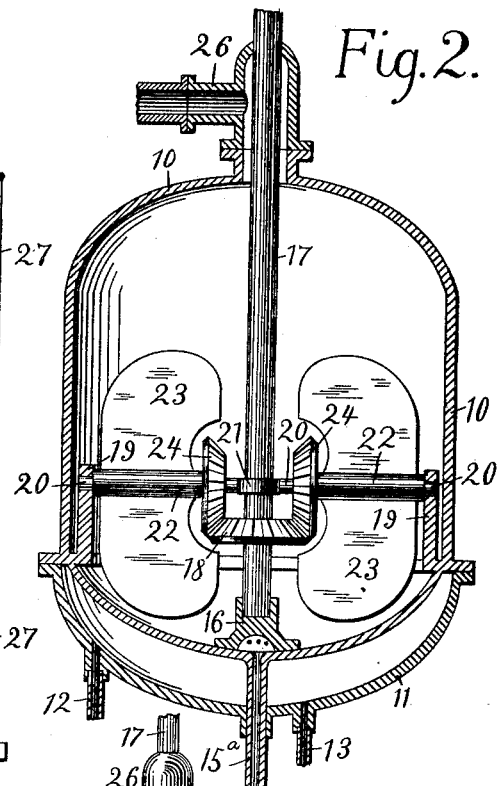
Figures 3, 4:
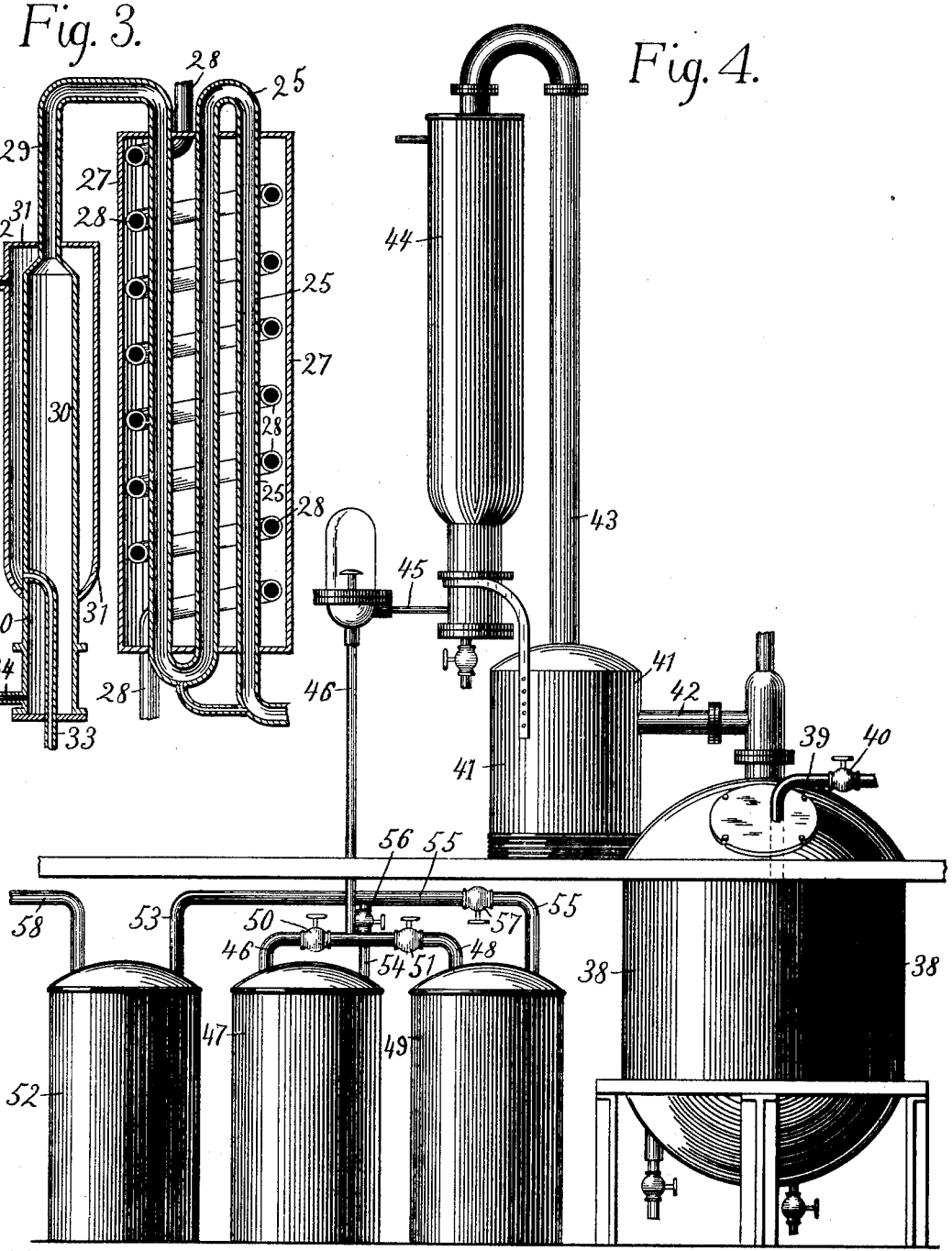

In the accompanying drawings, which illustrate one form of apparatus by which my improved process may be carried on, Figure 1 is a side elevation of the apparatus for preparing the acetanilid. Fig. 2 is a vertical section through the retort shown in Fig. 1. Fig. 3 is a vertical section through the condensing apparatus shown in Fig. 1, and Fig. 4 is a side elevation of the apparatus for separating the acetanilid from anilin-oil.

Like marks of reference refer to similar parts in the various views of the drawings.

10, Figs. 1 and 2, is a retort provided at its lower portion with a steam-jacket 11, to and from which lead inlet and outlet pipes 12 and 13, each of which is provided with a regulating-valve 14 and 15, respectively.

$15^a$ is a pipe for drawing off the contents of the retort 10. Passing through the top of the retort 10 and journaled in a suitable bearing 16 in the bottom of the same is a shaft 17, to which is rigidly secured a bevel gear-wheel 18, Fig. 2. Carried in suitable supports 19 at opposite sides of the retort 10 is a non-rotary shaft 20, which is provided at its center with a collar 21, through which the shaft 17 passes. Over each end of the shaft 20 is placed a sleeve 22, carrying a stirring-blade 23. To each of the sleeves 22 is secured a bevel gear-wheel 24, which meshes with the bevel gear-wheel 18. Thus when the shaft 17 is rotated the stirring-blades 23 are rapidly rotated in opposite directions, so that the contents of the retort are vigorously agitated and internally mixed.

Leading from the retort 10 to a condenser 25 is a pipe 26. The condenser 25 is what is known as a "return-condenser"—that is, one which is so constructed that the liquid condensed in it will be returned to the retort. Surrounding the return-condenser 25 is a water-jacket 27, in which is placed a steam-coil 28 for regulating the temperature of the water in the same.

29 is a pipe leading from the return-condenser to a plain condenser 30. Surrounding this condenser 30 is a water-jacket 31, having suitable inlet and outlet pipes 32 and 33, respectively.

34 is a pipe leading from the condenser 30 to any suitable vessel in which it is desired to collect the distillate.

Fig. 4 shows the apparatus for purifying the acetanilid from acetic acid and anilin-oil. 38 is a retort provided with an agitating device and steam-jacket and in all other respects exactly similar to the retort 10, except that it has in addition a steam-pipe 39, extending to its lower portion for subjecting its contents to the action of live steam. This pipe 39 is provided with a suitable regulating-valve 40. Leading from the retort 38 to a drip 41 is a pipe 42.

43 is a pipe leading from the said drip 41 to a plain condenser 44, exactly similar to the condenser 31, previously described. Leading from the condenser 44 is a pipe 45. This pipe 45 is provided with a branch 46, leading to a receiver 47, and a branch 48, leading to a receiver 49. In the branch 46 is a valve 50, controlling the flow of the distillate to the receiver 47, and in the branch 48 is a valve 51, controlling the flow of the distillate to the receiver 49.

52 is a wash vessel from which leads a pipe 53, provided with a branch 54, communicating with the receiver 47, and a branch 55, communicating with the receiver 49. In the branch 54 is interposed a valve 56 and in the branch 55 a valve 57. Leading from the wash vessel 52 to a suitable air-pump is a pipe 58. The wash vessel 52 is partly filled with a solution of caustic soda, its object being to protect the air-pump from acid fumes.

The method of carrying on my process is as follows: The retort 10 is charged with equivalent quantities of anilin-oil and acetic acid, a moderate excess of anilin-oil being added. Steam is now admitted to the steam-jacket 11 by opening the valves 14 and 15 and the shaft 17 rotated by any suitable power to vigorously mix the contents of the retort. The flow of steam to the jacket 11 and through the coil 28, surrounding the return-condenser 25, is now regulated, so that the distillate flowing from the plain condenser 30 consists of water containing only very small quantities of acetic acid and anilin-oil, the latter of which may be recovered in the usual way. As the distillation continues the distillate flowing from the condenser 30 increases in strength. As soon as it is found to contain about eight (8) per cent. of acetic acid the distillation is discontinued. The contents of the retort 10 will now be found to consist of acetanilid and from ten (10) to fifteen (15) per cent. of anilin-oil and a little acetic acid, the product being about the same as that obtained by the present method of boiling glacial acetic acid with anilin-oil. The contents of the retort 10 are now drawn off through the pipe 15ª and transferred to the retort 38, the valves being all closed. The agitating device in the said retort 38 is now set into operation and steam admitted into the steam-jacket, as described in reference to the retort 10. The valve 50 is now opened, connecting the condenser 44 with the receiver 47, and the valve 56, also opened, connecting the said receiver 47, through the wash vessel 52, with the air-pump. A high vacuum is thus maintained in all parts of the apparatus, so that the anilin-oil is distilled over without decomposing the acetanilid. As soon as the distillation ceases under these conditions, all but slight traces of anilin-oil has been removed. To remove the last trace of anilin-oil, the valves 50 and 56 are closed and the valves 51 and 57 opened, connecting the receiver 49 with the condenser 44 and air-pump. The distillation is now continued as before, except that live steam is admitted to the retort 38 through the pipe 39 by opening the valve 40. This is continued until the sample taken from the retort 38 is found to be practically free from anilin-oil, when the contents of the said retort are drawn off and subjected to the usual refining operations. The last trace of anilin-oil may also be removed by the use of live steam without a vacuum; but the use of a vacuum greatly facilitates the operation.

The strength of acetic acid which I prefer to use is from thirty (30) to sixty (60) per cent., these being the ordinary grades of the market; but I do not wish to limit myself to the use of these grades, as my process may be used with any strength of acid less than glacial acid; nor do I wish to limit myself to the use of the apparatus shown and described, as my process may be carried on with other apparatus.

Having fully described my invention, what I claim as new, and desire to secure by Letters Patent of the United States, is—

1. The process of purifying acetanilid which consists in separating from it the main part of the anilin-oil and acetic acid by subjecting the same to distillation under reduced pressure while agitated.

2. The process of purifying acetanilid which consists in separating from it the last trace of anilin-oil and acetic acid by subjecting the same to distillation while under the action of live steam.

3. The process of purifying acetanilid which consists in separating from it the acetic acid and anilin-oil by subjecting the same to distillation under reduced pressure while agitated, until the greater portion of the acetic acid and anilin-oil is removed, and then subjecting the remaining product to the action of live steam and continuing the operation until the remaining quantities of acetic acid and anilin are removed.

4. The process of manufacturing acetanilid which consists in subjecting acetic acid and anilin-oil to distillation while agitated, subjecting the product thus obtained to distillation under reduced pressure while agitated until the greater portion of the free anilin-oil and acetic acid has been removed, and then subjecting the remaining product to the action of live steam and continuing the operation until all the acetic acid and anilin-oil has been removed.

In testimony whereof I have hereunto set my hand and seal in the presence of the two subscribing witnesses.

FREDERICK W. A. FRERICHS. [L. S.]

Witnesses:
  WILFRID A. ALEXANDER,
  E. E. VEMELL.